March 5, 1968   J. FORTEN   3,372,061
FUEL CELL INCLUDING POROUS PALLADIUM-SILVER ALLOY ELECTRODE
Filed Aug. 19, 1965
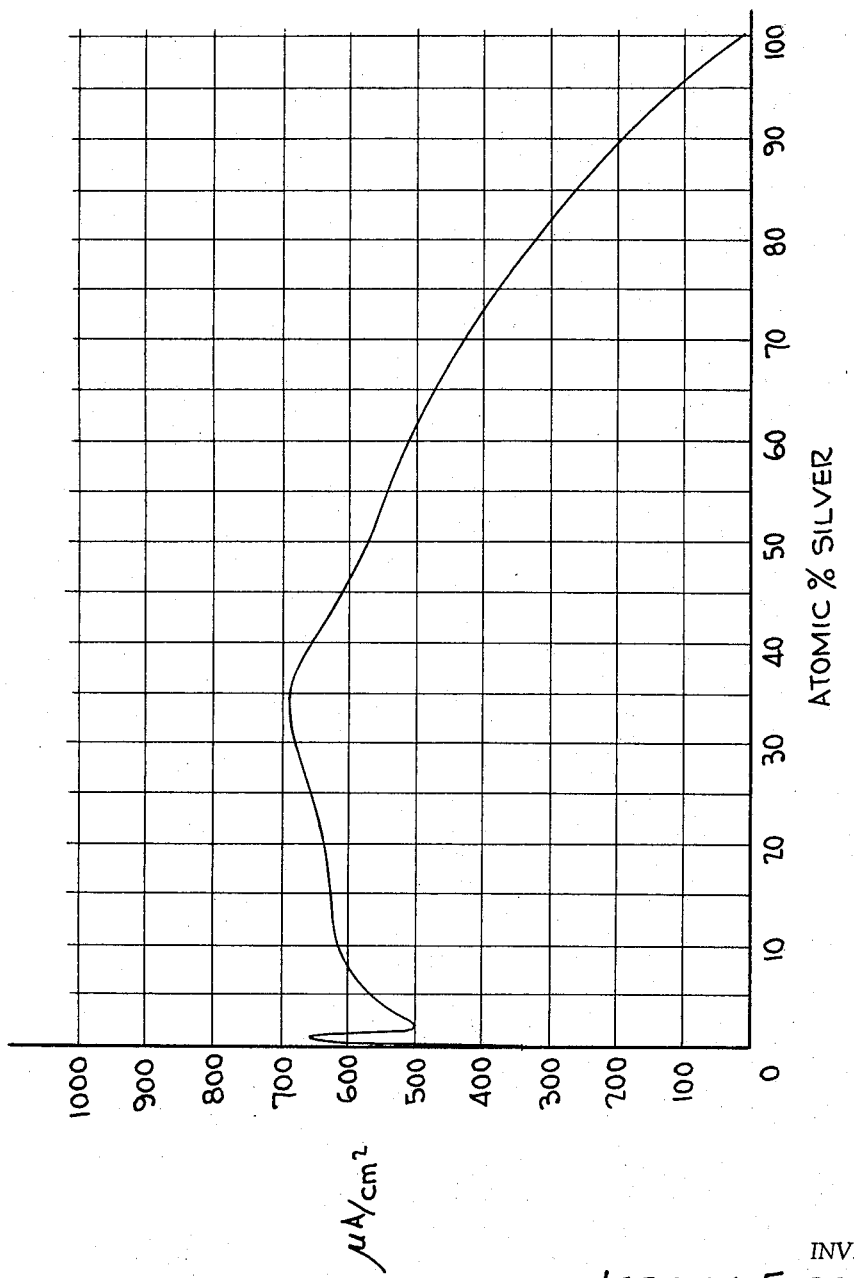
INVENTOR,
JEREMY FORTEN 3,372,061
FUEL CELL INCLUDING POROUS PALLADIUM-SILVER ALLOY ELECTRODE
Jeremy Forten, New York, N.Y., assignor to Leesona Corporation, Warwick, R.I., a corporation of Massachusetts
Continuation-in-part of application Ser. No. 143,561, Oct. 9, 1961. This application Aug. 19, 1965, Ser. No. 480,886
5 Claims. (Cl. 136—86)

This application is a continuation-in-part of my copending application Ser. No. 143,561 filed Oct. 9, 1961, now abandoned.

This invention relates to improved electrodes for use in an electrochemical device and, more particularly, to reduction electrodes for use in a fuel cell. The electrodes of the invention comprise palladium alloys containing from about 0.25 to 90 atomic percent silver.

In the prior art, palladium has been recognized to have excellent properties as an activator for electrodes in an electrochemical device, and, more particularly, in fuel cell electrodes. Palladium, however, is an expensive material detracting from its use in a commercial cell. Therefore, an effort has been made in the art to obtain electrodes providing equivalent performance, or substantially equivalent performance to palladium, but which are cheaper in construction. Additionally, an effort has been made to obtain materials having improved electrochemical activity, under given conditions, using the electrochemical activity of palladium as a reference point. It has now been found that porous palladium-silver alloy electrodes containing from about 0.25 to 90 atomic percent silver are superior in performance to palladium electrodes, or provide substantially equivalent performance but being considerably more economical due to the lower cost of silver, are commercially feasible.

Accordingly, it is an object of the present invention to provide fuel cell reduction electrodes which have good activation characteristics.

It is another object of this invention to provide reduction electrodes from a relatively inexpensive palladium alloy containing from about 0.25 to 90 atomic percent silver.

These and other objects of the invention will become more readily apparent from the following detailed description, with particular emphasis being placed on the illustrative examples.

According to the present invention, it has been found that alloys of palladium and silver have substantially different properties in the activation of a fuel cell reduction electrode over pure palladium or pure silver. Thus, it has been found that palladium-silver alloys containing from as low as 0.25 atomic percent silver and as high as 76 atomic percent silver provide greater electrochemical activity than pure palladium, although silver is much less effective than palladium (by a factor of more than 65) as an activator in the fuel cell reduction electrode. Moreover, electrodes having up to 90 atomic percent silver and only 10 atomic percent palladium provide electrochemical characteristics approaching that of pure palladium. Such electrodes are attractive commercially in view of their relatively lower cost. Although palladium alloy electrodes containing from about 0.25 to 90 atomic percent silver can be employed according to the instant invention, alloys containing from about 0.25 to 35 atomic percent silver are preferred with optimum ratios being obtained from electrodes containing 1.0 atomic percent silver and 35 atomic percent silver.

To demonstrate the performance of the described alloys as oxygen electrodes, tests were performed at 40° C. in one normal potassium hydroxide saturated with oxygen. Current was recorded at a constant voltage of 0.85 volt versus a hydrogen electrode in the same system. The test which used highly polished flat sheets are only for establishing the relative electrochemical activity as a function of the alloy composition. Understandably, higher current densities are obtained when the alloys are formed into porous sintered structures. The following data for the stated alloy were obtained:

| Pd-Ag alloy, percent Ag | Current density, $\mu a./cm.^2$ |
|---|---|
| 0.0 | 340 |
| 0.25 | 560 |
| 0.5 | 610 |
| 1.0 | 660 |
| 2.0 | 500 |
| 5.0 | 570 |
| 10.0 | 620 |
| 15.0 | 620 |
| 20.0 | 640 |
| 25.0 | 610 |
| 30.0 | 680 |
| 35.0 | 690 |
| 42.0 | 510 |
| 45.0 | 570 |
| 51.0 | 560 |
| 55.0 | 540 |
| 60.0 | 530 |
| 65.0 | 470 |
| 70.0 | 430 |
| 76.0 | 360 |
| 86.0 | 260 |
| 90.0 | 200 |
| 96.0 | 60 |
| 99.0 | 35 |
| 100.0 | 5 |

The data which is also plotted as FIGURE 1 of the drawing demonstrates the unusual behavior of the palladium-silver alloys. Thus, from the plot, it is seen that as little as 0.25 atomic percent silver increases the current density from 340 microamps per square centimeter for pure palladium to 560 microamps. When one atomic percent silver is used, a peak performance of 660 microamps per square centimeter is obtained. At two atomic percent silver, a reduced performance of 500 microamps per square centimeter is obtained; however, the electrode is still superior to pure palladium. A second peak and an optimum performance of 690 $\mu a./cm.^2$ is obtained at about 35 atomic percent silver and 65 atomic percent palladium. Although the performance with increased amounts of silver above 35 atomic percent decreases, the performance is still unexpectedly better than pure palladium at percentages up to 62 atomic percent silver, as apparent from the drawing and due to the lower cost of the alloy, has a decided commercial advantage. The drop in performance is continuous until, at approximately 76 atomic percent silver, the performance of the alloy is almost identical to pure palladium. The drop in performance thereafter continues, with pure silver showing a current density of only 5 microamps per square centimeter. Even at 90 atomic percent silver, the performance of the electrode is increased by a factor of about 40 over pure silver. Although this performance at 90 atomic percent silver is below that of pure palladium, in view of the reduced cost of the electrode, its use is commercially attractive. The data plotted in FIGURE 1, which is relative data, is highly unexpected and would not be predicted from the published fuel cell or electrochemical literature. There is no reason to expect that an alloy of palladium and silver would be better than pure palladium, or that as little as 10 percent palladium would increase the performance characteristics of a silver electrode by a factor of 40.

The electrodes of the invention, which comprise Pd-Ag aloys with from 0.25 to 90 atomic percent silver, can be substantially non-porous structures whereby the oxidizing gas is caused to flow against and around the electrode, or the structure can be porous and the oxidizing gas passed through the electrode. The recovery from polarization conditions of such electrodes to open circuit potential is rapid and the electrodes are resistant to corrosion and poisoning by impurities in the oxidant gas stream and in the electrolyte.

The paladium-silver alloys of the present invention can be employed in the preparation of porous electrodes by methods known in the art. Thus, alloy powders having a particle size of from about 1–100 microns can be compacted and sintered to form a porous structure. More specifically, a porous electrode can be prepared by placing a ring with a lip of the proper thickness, usually from about 0.003 inch to about 0.30 inch, over an alumina coated disc, pressing the powder of the selected particle size on the disc and striking off the excess powder so that a layer of powder approximately the thickness of the lip remains. The powders are then compacted, as for example, by vibratory techniques, and sintered. In the compaction operation, the pressure at which the alloy powders are pressed can vary over a relatively wide range. Thus, compaction can be carried out at pressures as low as about 500 p.s.i. and as high as about 8,000 p.s.i.

The sintering of the electrodes after compaction can be carried out in any of the usual sintering furnaces, as for example, a retort inclined furnace. It is possible and often desirable to sinter the samples according to a predetermined cycle, thus, the cycle may consist of preheating to a temperature of 200° F. for a short time and thereafter sintering at a temperature of from about 1,000–2,400° F. for a relatively longer period of time before cooling. The sintering can be carried out for varying lengths of time depending upon the sintering temperature. The sintering operation, often can be performed with advantage in an atmosphere of hydrogen or forming gas. At times, it may be preferable to carry out the sintering operation in air or a vaccum.

The reduction electrodes of the present invention are usually employed in cells operating at temperatures of from about 20–160° C., however, the temperatures to a large extent depend upon the fuel employed in the fuel cell as well as the activating material used at the fuel electrode. It has been found that the fuel cell systems employing the reduction electrodes of the instant invention can be operated within the temperature range of from about 20–650° C. with satisfactory performance.

The electrodes, since they are relatively inert to chemical reaction, can be employed in fuel cells using known prior art electrolytes such as the aqueous alkaline hydroxides and carbonates. Virtually, any ionic conductor which remains substantially invariant under the operating conditions of the cell can be employed. Additionally, the electrodes can be operated with known oxidizing gases including pure oxygen or air.

To more particularly describe the preparation of the claimed electrodes and to demonstrate their utility in fuel cells, Examples 1–3 inclusive are set forth as preferred embodiments of manufacturing a porous electrode; and Examples 4–6 demonstrate the use of the prepared electrodes in a fuel cell system.

EXAMPLE 1

A ring with a 0.20 inch lip is pressed over an alumina coated disc and a 1.5 atomic percent silver and 98.5 atomic percent palladium alloy powders having a particle size of from about 5–8 microns in diameter are placed on the disc. The disc is laterally vibrated on a vibrator at an amplitude of 0.006 inch for three minutes. The disc is then sintered in an inclined retort furnace at a temperature of 1830° F. for 45 minutes in an atmosphere of hydrogen. The resultant structure is substantially homoporous.

EXAMPLE 2

Palladium alloy powders having a particle size of from about 20–35 microns in diameter and containing 35 atomic percent silver are sifted into a ring having a 0.5 inch lip and compressed at a pressure of 3,000 p.s.i. for eight minutes. Thereafter, the structure is sintered at a temperature of 1400° F. for a period of 40 minutes. The resultant structure is a substantially homo-porous disc.

EXAMPLE 3

A powdered palladium alloy containing 75 atomic percent silver and having a particle size of from about 5–10 microns is sifted into a ring having a lip of from about 0.3 inch. The disc is compacted at a pressure of 2,000 p.s.i. and thereafter sintered for 80 minutes at 1200° C. in an inclined retort furnace. The resultant disc is substantially homo-porous.

EXAMPLE 4

A fuel cell was devised in a suitable housing employing the electrode of Example 1 as the reduction electrode, a non-porous 25% Ag–74% Pd–1% Nb hydrogen diffusion anode and using an eight molar aqueous potassium hydroxide electrolyte. The cell when operated at atmospheric pressure and a temperature of 55° C. employing hydrogen as the fuel and air as the oxidant demonstrated excellent polarization characteristics.

EXAMPLE 5

A fuel cell system having the reduction electrode of Example 2, a non-porous 25% silver–75% palladium hydrogen diffusion anode and using a 28% aqueous potassium hydroxide electrolyte is devised in a suitable housing. The cell when operated at one atmosphere and a temperature of 95° C. using hydrogen as the fuel and air as the oxidant demonstrated good electrochemical performance characteristics.

EXAMPLE 6

A fuel cell is constructed in a suitable housing having a cathode prepared as in Example 3, a non-porous 25% silver-75% palladium hydrogen diffusion anode and using a five molar aqueous potassium hydroxide electrolyte. The cell when operated at atmospheric pressure and at a temperature of 95° C. using hydrogen as the fuel and air as the oxidant demonstrated good electrochemical performance characteristics.

The illustrative examples are given as preferred embodiments and the invention is not to be construed as being limited thereby. It is possible to produce still other embodiments of the invention without departing from the spirit of the invention and scope of the appended claims.

What is claimed is:

1. A fuel cell for the direct generation of electricity from a fuel and oxidant comprising a housing, a porous cathode comprising a palladium-silver alloy consisting essentially of palladium and from about 0.25–62 atomic percent silver, an anode and an electrolyte between said cathode and anode.

2. The fuel cell of claim 1 wherein the palladium-silver alloy consists essentially of palladium and from about 0.25–35 atomic percent silver.

3. The fuel cell of claim 1 wherein the palladium-silver alloy consists essentially of palladium and about 1.0 atomic percent silver.

4. The fuel cell of claim 1 wherein the palladium-silver alloy consists essentially of palladium and about about 0.25–10 atomic percent silver.

5. The fuel cell of claim 1 wherein the palladium-silver alloy consists essentially of palladium and about 35 atomic percent silver.

References Cited

UNITED STATES PATENTS

| 3,180,762 | 4/1965 | Oswin | 136—86 |
| 3,062,909 | 11/1962 | Reutschi | 136—86 |
| 3,092,517 | 6/1963 | Oswin | 136—86 |

ALLEN B. CURTIS, *Primary Examiner.*

WINSTON A. DOUGLAS, *Examiner.*